US 6,640,267 B1

(12) United States Patent
Raza

(10) Patent No.: US 6,640,267 B1
(45) Date of Patent: Oct. 28, 2003

(54) ARCHITECTURE FOR MULTI-QUEUE STORAGE ELEMENT

(75) Inventor: S. Babar Raza, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/406,042

(22) Filed: Sep. 27, 1999

(51) Int. Cl.[7] .................................................. G06F 3/00
(52) U.S. Cl. ............................ 710/38; 710/39; 710/52; 710/316; 711/118
(58) Field of Search ........................... 710/5, 6, 22, 23, 710/28, 31, 33, 36, 37, 38, 39, 52, 54, 305, 310, 316

(56) References Cited

U.S. PATENT DOCUMENTS

| | | | | |
|---|---|---|---|---|
| 5,692,138 A | * | 11/1997 | Fandrich et al. | |
| 5,717,875 A | * | 2/1998 | Cutlerywala et al. | |
| 5,732,269 A | * | 3/1998 | Compton et al. | |
| 5,802,552 A | * | 9/1998 | Fandrich et al. | ............. 711/103 |
| 5,956,522 A | * | 9/1999 | Bertone et al. | |
| 6,128,702 A | * | 10/2000 | Saulsbury et al. | ............ 711/119 |

* cited by examiner

*Primary Examiner*—Donald Sparks
*Assistant Examiner*—C. P. Chace
(74) *Attorney, Agent, or Firm*—Christopher P. Maiorana, P.C.

(57) ABSTRACT

A circuit comprising a memory and a logic circuit. The memory may be configured to read and write data in a plurality of memory queues to/from a write data path and a read data path in response to (i) a first and a second select signal and (ii) a first control signal. The logic circuit may be configured to generate (i) the first and second select signals and (ii) the control signal in response to one or more signals received from a read management path and/or a write management path.

20 Claims, 2 Drawing Sheets

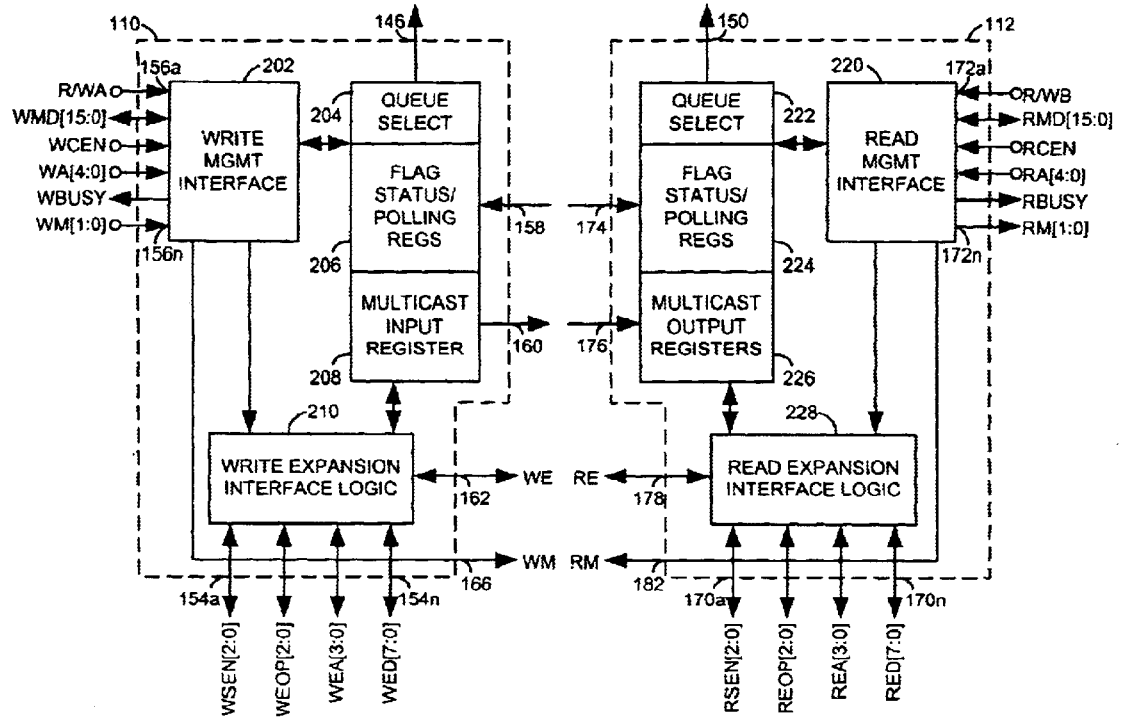
FIG. 2          FIG. 3
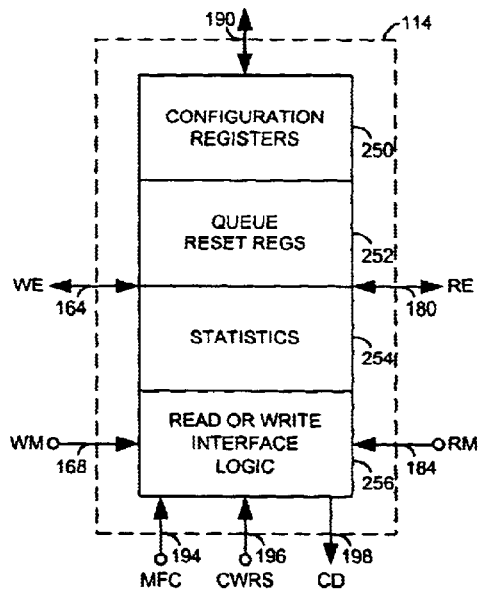
FIG. 4

ARCHITECTURE FOR MULTI-QUEUE STORAGE ELEMENT

CROSS REFERENCE TO RELATED APPLICATION

The present application may relate to co-pending application Ser. No. 09/406,667, filed Sep. 27, 1999 which is each hereby incorporated by reference in its entirety.

FIELD OF THE INVENTION

The present invention relates to storage elements generally and, more particularly, to a method and/or architecture for a multi-queue storage element.

BACKGROUND OF THE INVENTION

Conventional storage circuits cannot manage multi-queue configuration, status information, queue selection, queue reset operation and/or multicast/broadcast support functions. As the spread (i.e., the number of FIFOs) of conventional storage circuits increases, the write enable signal and the read enable signal require additional circuitry, since they are implemented as point-to-multipoint connections.

A delay queue selection write operation requires a point-to-multipoint data interface. The point-to-multipoint interface requires additional circuitry and, in some cases, may even be impossible as the frequency of operation increases. A delay queue selection operation requires an additional management interface. The management interface further requires additional circuitry and, in some cases, may even be impossible as the frequency of operation increases.

A multi-queue operation requires additional external logic to determine the flag status of each queue that is presented on the pin. For example, if 16 flags are presented on the pins for full and empty flags simultaneously, 32 external flag detection logic circuits would be required. A multi-queue operation implementing token-passing further requires complicated end of packet (EOP) logic communication between chips. Additionally, a point to multi-point (or multi-point to point) operation requires additional logic to avoid bus contention at the read interface.

SUMMARY OF THE INVENTION

The present invention concerns a circuit comprising a memory and a logic circuit. The memory may be configured to read and write data in a plurality of memory queues to/from a write data path and a read data path in response to (i) a first and a second select signal and (ii) a first control signal. The logic circuit may be configured to generate (i) the first and second select signals and (ii) the control signal in response to one or more signals received from a read management path and/or a write management path.

The objects, features and advantages of the present invention include providing a multi-queue storage element that may (i) comprise variable sized queues, (ii) automatically move to a different block in response to an end-of-packet (EOP), (iii) provide flexible flag access and/or (iv) provide a high speed interface.

BRIEF DESCRIPTION OF THE DRAWINGS

These and other objects, features and advantages of the present invention will be apparent from the following detailed description and the appended claims and drawings in which:

FIG. 2 is a detailed block diagram of the write logic circuit of FIG. 1;

FIG. 3 is a detailed block diagram of the read logic circuit of FIG. 1; and

FIG. 4 is a detailed block diagram of the interface logic circuit of FIG. 1.

DETAILED DESCRIPTION OF THE PREFERRED EMBODIMENTS

Figure 1:
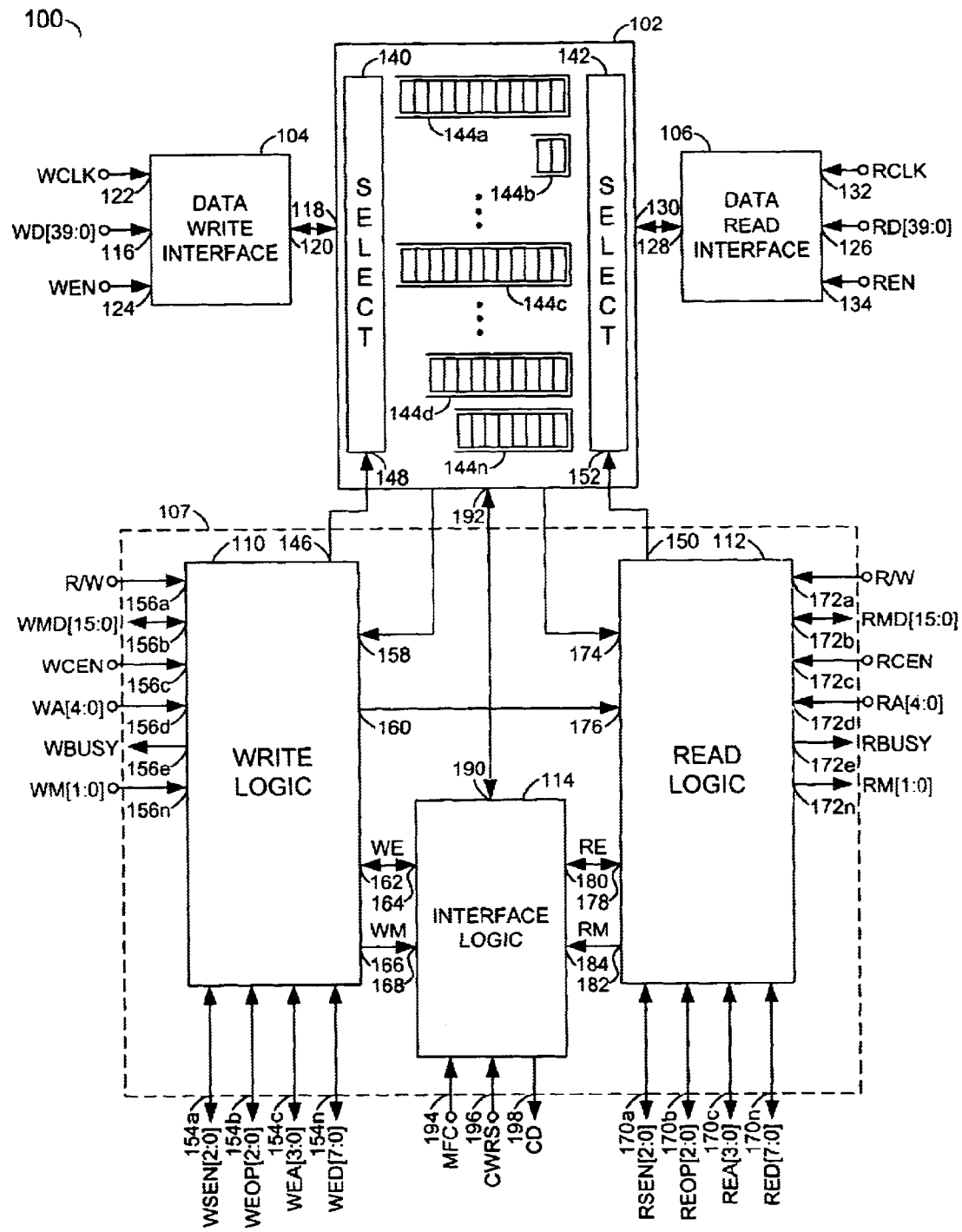
FIG. 1 is a block diagram of a preferred embodiment of the present invention.

Referring to FIG. 1, a block diagram of a circuit 100 is shown in accordance with a preferred embodiment of the present invention. The circuit 100 generally comprises a memory 102, an interface 104, an interface 106, and a logic section (or circuit) 107. The logic circuit 107 may comprise a logic block (or circuit) 110, a logic block (or circuit) 112 and an interface logic block (or circuit) 114. The interface 104 may be implemented, in one example, as a write data interface. The interface 106 may be implemented, in one example, as a read data interface. However, the interface 104 and the interface 106 may be implemented as other type interfaces in order to meet the criteria of a particular implementation.

In one example, the memory 102 may be implemented as a multi-queue FIFO. The circuit 100 is generally capable of storing data in 1 to N independently variable size queues 144a–144n, where N is an integer. In one example, the maximum number of queues may be 64. However, a greater number of queues 144a–144n may be implemented accordingly to meet the design criteria of a particular implementation. Each of the queues 144a–144n may be individually configured from a minimum depth of 0 blocks to the maximum depth of the circuit 100. The circuit 100 may be expanded both in width and in depth, each at wire speed. The circuit 100 may provide depth and width expansion as found in co-pending application Ser. No. 09/406,667 that is hereby incorporated by reference in its entirety.

A packet of data that may enter the circuit 100 is generally broken down into blocks of, in one example, 64-bytes prior to storage. A flag status for each queue is generally updated once a block of data is written into or extracted from the particular queue 144a–144n.

The write interface 104 may receive data at an input 116 from a bus (e.g., WD). The bus WD is shown implemented as a 40-bit bus. However, the particular bit-width of the bus WD may be adjusted accordingly to meet the design criteria of a particular implementation. The data may be written to the memory 102, through a bidirectional connection between a connection 118 of the memory 102 and a connection 120 of the write interface 104. Data received from the bus WD may be written in response a clock signal (e.g., WCLK) received at an input 122 and an enable signal (e.g., WEN) received at an input 124. The write interface 104 may write the data to the memory 102, in one example, on a rising edge of the clock signal WCLK when the signal WEN is low. The write interface 104 may ignore the data on the bus WD when the signal WEN is high.

Data is generally presented to a bus (e.g., RD) connected to an output 126 of the read interface 106. The bus RD is shown implemented as a 40-bit bus. However, the particular bit-width of the bus RD may be adjusted accordingly to meet the design criteria of a particular implementation. Data may be read from the memory 102, through a bidirectional connection between a connection 128 of the read interface 106 and a connection 130 of the memory 102. Data may be read in response to a clock signal (e.g., RCLK) received at an input 132 and an enable signal (e.g., REN) received at an input 134. The read interface 106 may read the data from the memory 102, in one example, on a rising edge of the clock signal RCLK when the signal REN is low. The read interface 106 may not update the data on the bus RD when the signal REN is high.

The memory 102 may comprise a select block (or circuit) 140 and a select block (or circuit) 142. The select block 140 may have an input 148 that may receive a select signal from an output 146 of the write logic 110. The select block 140 may select a particular one of the queues 144a–144n to write data to in response to the signal received at the input 148. The select block 142 may have an input 152 that may receive a select signal from an output 150 of the read logic circuit 112. The select block 142 may select one of the queues 144a–144n to read data from in response to the select signal received at the input 152.

The write logic block 110 may have a number of inputs 154a–154n and a number of inputs 156a–156n. The input 154a may receive a signal (e.g., WSEN), the input 154b may receive a signal (e.g., WEOP), the input 154c may receive a signal (e.g., WEA), and the input 154n may receive a signal (e.g., WED). The input 156a may receive a signal (e.g., R/W), the input 156b may receive a signal (e.g., WMD), the input 156c may receive a signal (e.g., WCEN), the input 156d may receive a signal (e.g., WA), the input 156e that may receive a signal (e.g., WBUSY), and the input 156n that may receive a signal (e.g., WM). The particular polarities (e.g., active high or active low) and the bit-width of the signals received at the inputs 154a–154n and the inputs 156a–156n may be adjusted accordingly to meet the design criteria of a particular implementation. The signals received at the inputs 156a–156n may be status signals that may indicate the fullness and/or other status information of the memory 100. The signals received at the inputs 156a–156n may be received from the write interface 104. The write logic circuit 110 may also have an input 158 that may receive a signal from the memory 102, an output 160 that may present a signal to the read logic circuit 112, an input/output 162 that may connect a signal (e.g., WE) to the circuit 114, and an output 166 that may present a signal (e.g., WM) to an input 168 of the interface logic circuit 114.

The read logic circuit 112 may have a number of inputs 170a–170n, a number of inputs or outputs 172a–172n, an input 174, an input 176, an input/output 178, and an output 182. The input 170a may receive a signal (e.g., RSEN[2:0]), the input 170b may receive a signal (e.g., REOP[2:0]), the input 170c may receive a signal (e.g., REA[3:0]) and the input 170n may receive a signal (e.g., RED[7:0]). The input 172a may receive the signal R/W, the input/output 172b may receive a signal (e.g., RMD[15:0]), the input 172c may receive a signal RCEN, the output 172d may present a signal (e.g., RA[4:0]), the output 172e may present a signal (e.g., RBUSY) and the output 172n may present a signal (e.g., RM[1:0]). The particular bit-widths and polarities of the signals received at the inputs 170a–170n and 172a–172n may be adjusted to meet the design criteria of a particular implementation. The signals received at the inputs 172a–172n may be status signals that may indicate the fullness and/or other status information of the memory 100. The signals received at the inputs 172a–172n may be received from the read interface 106. The input 174 may receive a signal from the memory 102. The input 176 may be connected to the output 170 of the write logic circuit 110. The input 178 may connect a signal (e.g., RE) to an input/output 180 of the interface logic circuit 114. The output 182 may present a signal (e.g., RM) to an input 184 of the interface logic 114.

The interface logic circuit 114 may have an input 190 that may receive a control signal from an output 192 of the memory 102. The interface logic circuit 114 may also have an input 194 that may receive a signal (e.g., MFC), an input 196 that may receive a signal (e.g., CWRS) and an output 198 that may present a signal (e.g., CD).

A point-to-point connection for (i) the signal WEN and the signal REN and (ii) an end-of-packet indication is generally provided through the signal WSEN[2:0], the signal RSEN[2:0], the signal WEOP[2:0] and the signal REOP[2:0]. The signals WSEN[2:0], RSEN[2:0], WEOP[2:0] and REOP[2:0] may be implemented, in one example, as expansion signals. The expansion signals WSEN, RSEN, WEOP and REOP may eliminate the need for external buffering. For applications that cannot tolerate clock latency, the circuit 100 may be configured to connect the signal WEN and the signal REN directly to the source rather than through the interface logic 114.

Referring to FIG. 2, a detailed block diagram of the write logic circuit 110 is shown. The write logic circuit 110 generally comprises a write management interface block (or circuit) 202, a queue select block (or circuit) 204, a flag status/polling register block (or circuit) 206, a multicast input register block (or circuit) 208 and a write expansion interface logic block (or circuit) 210.

Referring to FIG. 3, a more detailed block diagram of the read logic circuit 112 is shown. The read logic circuit 112 generally comprises a read management interface block (or circuit) 220, a queue select block (or circuit) 222, a flag status/polling register block (or circuit) 224, a multicast output register block (or circuit) 226 and a read expansion interface logic block (or circuit) 228.

Referring to FIG. 4, a more detailed block diagram of the interface logic circuit 114 is shown. The interface logic circuit 114 may comprise a configuration register block (or circuit) 250, a queue reset register block (or circuit) 252, a statistics block (or circuit) 254 and a read or write interface logic block (or circuit) 256.

During a write operation, the write logic block 110 may automatically move to a different block when an end-of-packet (EOP) is encountered. The write logic block 110 may then begin to write the new data packet into a new block. A current queue address for the write logic circuit 110 may be provided by an external device connected to the circuit 100 anywhere within a first number of specified cycles from a start-of-packet (SOP) received by the write logic circuit 110. The current queue may be stored in the queue select register 204. The write logic block 110 generally assumes that when the current queue address is not specified within the first number of specified cycles of a new packet, the new packet belongs to the same queue as the previous packet.

In a read operation, once the EOP is encountered, the read logic block 112 may automatically move to the next packet to be serviced. A first block of the next packet may belong to the same queue or a different queue. When the data from a different queue needs to be serviced, the next queue select address may be provided within a specified number of cycles between the SOP and the EOP. The next queue select address may be stored in the queue select register 222. When a scheduler (e.g., a device connected to the read management interface) does not provide the next queue address within the specified cycles prior to the EOP, the circuit 100 assumes that the next packet also belongs to the same queue as the current packet. In the event the scheduler (not shown) is unable to provide the next queue address within the specified cycles prior to the EOP, the scheduler may finish reading the current packet and then stop. After the scheduler finishes reading the data, the scheduler may write the next queue address and wait for the specified cycles. After a predetermined number of cycles, the scheduler may begin reading the data from the new queue.

The circuit 100 may also provide a delayed queue selection feature during a write operation. The delayed queue selection feature may allow the data to be stored in one or more temporary buffers before receiving the queue address information. The delayed queue selection feature generally reduces the latency of the circuit 100 and may eliminate the need for the queue classifier to hold data before determining the queue address.

The write management interface 202 and the read management interface 220 may perform management functions that may include flag status update, queue selection, configuration, queue reset operation, multicast port information communication, and, in the case of a read interface, multicast queue flush information.

Flexible flag access modes may be provided by allowing direct access to the flag of a particular queue within, in one example, 2 cycles. A polling mode may access the flag information for all the queues in a sequential manner. The flexible polling mode may be available to access full/almost-full or empty/almost-empty flags in a burst mode. Programmable almost-full and almost-empty bits per queue are also provided for variable thresholds for indicating almost-full and almost-empty status for each queue. A memory almost-full flag and marker are also provided to communicate memory status for oversubscribed memory configuration.

The registers 206 and 224 may be provided to store the queue depth information. The registers 206 and 224 may be used to indicate full/almost-full status along with almost-full marker bits. When the number of blocks remaining in the selected queue 144a–144n becomes less than the almost-full threshold, the almost-full flag is generally updated. When the number of blocks available for the selected queue 144a–144n is zero (e.g., where there is no space available for that queue based on the queue depth register), a full flag for the selected queue 144a–144n is generally updated. The circuit 100 then begins to ignore any further writes to the selected queue 144a–144n. The circuit 100 begins writing the data once the space is available in the selected queue 144a–144n. Similarly, when the number of blocks for a particular queue is less than the almost-empty threshold value set in the almost-empty marker bits for the selected queue 144a–144n, the almost-empty flag is generally updated. When the last read is performed from the selected queue 144a–144n, the empty flags are updated indicating this is the last block for the selected queue 144a–144n.

The packet count information is also provided that may indicate the number of partial and complete packets inside the device for a particular queue 144a–144n. The circuit 100 may also maintain the EOP pattern count as well as any other patterns stored in the configuration register 250. These patterns may be SOP marker or any other tag information. Queue data may be accessed on a per-queue and per-field basis. Configuration information is loaded from either the read management interface 220 or the write management interface 202. The write management interface 202 may also provide buffer information for each queue 144a–144n. The queue classifier may use the buffer information to look-ahead in the device for the particular queue 144a–144n. The read management interface 220 may provide blocks of memory information for the scheduler to look-ahead. Such information may be used to service a particular queue.

A queue reset feature is provided to reset a particular queue 144a–144n while other queues are functioning. The reset feature may be used by a management entity to flush out low priority queues, in favor of high-priority queues, in case the memory 102 is becoming full. When the queue reset operation is in progress, a queue full flag may be asserted and presented to the write logic 110 and an empty flag may be asserted and presented to the read logic 112. Once the queue reset operation is complete, the queue full and empty flags will generally reflect the state of the selected queue 144a–144n.

In one example, four of the 64 queues may be capable of supporting multicast/broadcast operations. This makes the circuit 100 an ideal buffer element for a switch fabric. The circuit 100 may be configured to support, for example, a 16 port router/switch configuration with 4 levels of priority. The circuit 100 may also be configured to support a 32 port router/switch configuration with 2 levels of priority. In one example, four multicast/broadcast queues may also be configured as unicast queues. In one implementation, the queues that may be configured as multicast queues may be the queues 0, 16, 32 and 48. In another implementation, the queues that may be configured as multicast queues may be the queues 15, 31, 47 and 63. However, the particular queues (and the number of queues) that may be configured as multicast queues may be adjusted accordingly to meet the design criteria of a particular implementation.

In router/switch applications, support for 4 levels (or more) of priorities may be implemented. For multicast queues, the data is not automatically removed from the queue after being transmitted. The data is only removed when the external queue scheduler sends a flush command during a last-read operation for the particular packet. When the circuit 100 receives the flush command for the multicast queue (which indicates that this is the last read operation for the current packet) the packet may be treated as a unicast packet that may be removed from the queue memory when the packet is read. During the last-read operation, the statistics block 254 may also be updated. Examples of switch fabrics and multicast environments may be found in co-pending applications U.S. Ser. Nos. 09/347,830, 09/370, 262 and 09/347,046, each of which is hereby incorporated by reference in its entirety.

The multicast input port register 208 and the multicast output registers 224 are provided to communicate multicast port information from the queue selector/classifier 204 to the queue scheduler 222. The queue selector/classifier 204 may write the information into the multicast input port register 208 after a current queue address is specified. For the packet at the top of the queue, this information is stored in the multicast output port registers 226 for each multicast queue 144a–144n. The scheduler may then read the multicast port information from the multicast output registers 226. For the packets which are not at the top of the queue, such information may be stored with the data.

The interfaces 104 and 106 may be implemented as high speed data interfaces that support up to, in one example, 10Gb/s throughput. In one example, an X40 data interface may be implemented for both data write and read operations, each running at, for example, 125 MHz. Each of the interfaces 104 and 106 may also be configured as an X20 or an X10 interface with bus matching. The data read and write operations may be implemented completely asynchronously and the data may be written to one queue and read from a different queue simultaneously. The data is written into the circuit 100 from the WD databus on the rising edge of the signal WCLK when the signal WEN is low. When the signal WEN is high, the data on the WD data bus is generally ignored. The data is read from the memory 102 on the RD databus on the rising edge of the signal RCLK when the signal REN is low. When the signal REN is high, the data on the RD bus is not updated. The point-to-point connection for the control signals (e.g., WEN/REN) and end-of-packet indicator are provided through the signals WSEN/RSEN and WEOP/REOP, which may eliminate the need for any external buffering. The use of the signals WSEN, RSEN and the signals WEOP/REOP from the master to the slave may result in an additional clock latency for each interface. For applications that cannot tolerate such latency, the circuit 100 may be configured to connect the signals WEN and REN directly to the source, rather than the master through the configuration registers 250.

The write management interface 202 may be a pipelined memory interface. The signal WM[1:0] may be used to communicate the EOP information to the circuit 100. The signal WM[1:0] may also be used to communicate SOP or any other tag information. The values on these bits are generally compared to the values stored in the configuration register 250. From these compared values, queue statistics may be generated which are stored in the statistics block 254. The value of the signal WM[1:0] appears on the signal RM[1:0] bits along with the data. The signals WBUSY and RBUSY may be the bits indicating that the current accessed value may be stale. Such a stale condition may occur when a block is written and is read from the same queue, and the read management interface 220 is trying to access the queue related data or the flags for the selected queue 144a–144n. Accessing information may be implemented as having lower priority compared to the block read and write update operations.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a memory configured to store data in a plurality of memory queues, wherein said data is (i) written to said plurality of memory queues from a write data path and (ii) read from said plurality of memory queues to a read data path in response to a first select signal, a second select signal and a first control signal; and
   a logic circuit configured to generate (i) said first and second select signals and (ii) said first control signal in response to one or more second control signals received from a read management path and/or a write management path.

2. The circuit according to claim 1, wherein said logic circuit further comprises:
   a first circuit configured to generate said first select signal in response to said one or more second control signals.

3. The circuit according to claim 2, wherein said logic circuit further comprises:
   a second circuit configured to generate said second select signal in response to said one or more second control signals.

4. The circuit according to claim 3, wherein said logic circuit further comprises:
   a third circuit configured to generate said first control signal in response to one or more first logic signals and one or more second logic signals.

5. The circuit according to claim 1, wherein said memory further comprises a select circuit configured to select one or more of said plurality of memory queues in response to said first and said second select signals.

6. The circuit according to claim 2, wherein said first circuit comprises a write logic circuit.

7. The circuit according to claim 6, wherein said write logic circuit comprises:
   a write management interface configured to control queue select information, queue status information, queue configuration information, queue reset information and queue statistics information.

8. The circuit according to claim 7, wherein said write logic circuit further comprises:
   one or more registers; and
   a write expansion interface logic circuit configured to control width, depth and/or queue expansion of said memory.

9. The circuit according to claim 3, wherein said second circuit comprises a read logic circuit.

10. The circuit according to claim 9, wherein said read logic circuit further comprises:
    a read management interface circuit configured to control read queue select information, flush information for one or more multicast/broadcast queues, queue status information, queue configuration information, queue reset and queue statistics information.

11. The circuit according to claim 10, wherein said read logic circuit further comprises:
    one or more registers; and
    a read expansion interface logic circuit configured to control width, depth and/or queue expansion of said memory.

12. The circuit according to claim 4, wherein said third circuit comprises an interface logic circuit.

13. The circuit according to claim 12, wherein said interface logic circuit comprises:
    one or more configuration registers;
    one or more queue reset registers;
    one or more statistic blocks; and
    a read or write interface logic circuit.

14. The circuit according to claim 1, wherein said memory comprises one or more storage elements.

15. The circuit according to claim 14, wherein said one or more storage elements comprise one or more write management storage elements configured to (a) select one of said memory queues for a write operation, (b) generate a write flag status for said one or more memory queues, and (c) provide an input register.

16. The circuit according to claim 14, wherein said one or more storage elements comprise one or more read management storage elements configured to (a) select one of said memory queues for a read operation, (b) generate a read flag status for said one or more memory queues, and (c) provide an output register.

17. The circuit according to claim 14, wherein said one or more storage elements comprise one or more programmable dual-ported storage elements configured to provide (a) queue statistics information and (b) queue configuration information.

18. A circuit comprising:
    means for storing data in a plurality of memory queues, wherein said data is (i) written to said plurality of memory queues from a write data path and (ii) read from said plurality of queues to a read data path in response to a first select signal, a second select signal and a first control signal; and
    means for generating (i) said first and second select signals and (ii) said first control signal in response to one or more second control signals received from a read management path and/or a write management path.

19. A method for storing data in a memory comprising the steps of:
    (A) writing data to a plurality of memory queues from a write data path and reading data from said plurality of memory queues to a read data path in response to (i) a first select signal, (ii) a second select signal and (iii) a first control signal; and (B) generating (i) said first and second select signals and (ii) said first control signal in response to one or more second control signals received from a read management path and/or a write management path.

20. The method according to claim 19, wherein a write to one of said plurality of memory queues is performed simultaneously with a read from another of said plurality of memory queues.

* * * * *